United States Patent
Zheng et al.

(10) Patent No.: US 9,696,486 B2
(45) Date of Patent: Jul. 4, 2017

(54) SURFACE-NORMAL COUPLER FOR SILICON-ON-INSULATOR PLATFORMS

(71) Applicant: Oracle International Corporation, Redwood City, CA (US)

(72) Inventors: Xuezhe Zheng, San Diego, CA (US); Ivan Shubin, San Diego, CA (US); John E. Cunningham, San Diego, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 648 days.

(21) Appl. No.: 13/955,705

(22) Filed: Jul. 31, 2013

(65) Prior Publication Data

US 2015/0362673 A1    Dec. 17, 2015

(51) Int. Cl.
*G02B 6/12* (2006.01)
*G02B 6/122* (2006.01)
(Continued)

(52) U.S. Cl.
CPC .......... *G02B 6/122* (2013.01); *G02B 6/136* (2013.01); *G02B 6/4214* (2013.01);
(Continued)

(58) Field of Classification Search
CPC ...... G02B 6/122; G02B 6/136; G02B 6/4214; G02B 2006/12061; G02B 2006/12104; G02B 2006/12176
See application file for complete search history.

(56) References Cited

U.S. PATENT DOCUMENTS 4,585,299 A * 4/1986 Strain ................. G02B 6/1347
 216/2
5,263,111 A * 11/1993 Nurse ................ G02B 6/12002
 385/130

(Continued)

OTHER PUBLICATIONS

J. Yao et al: "Grating-coupler based low-loss optical interlayer coupling" Group IV, Photonics, 2011, 383-385.

(Continued)

*Primary Examiner* — Ryan Lepisto
*Assistant Examiner* — Guy Anderson
(74) *Attorney, Agent, or Firm* — Park, Vaughan, Fleming & Dowler LLP

(57) ABSTRACT

A photonic integrated circuit (PIC) is described. This PIC includes an inverse facet mirror on a silicon optical waveguide for optical proximity coupling between two silicon-on-insulator (SOI) chips placed face to face. Accurate mirror facets may be fabricated in etch pits using a silicon micromachining technique, with wet etching of the silicon <110> facet at an angle of 45° when etched through the <100> surface. Moreover, by filling the etch pit with polycrystalline silicon or another filling material that has an index of refraction similar to silicon (such as a silicon-germanium alloy), a reflecting mirror with an accurate angle can be formed at the end of the silicon optical waveguide using: a metal coating, a dielectric coating, thermal oxidation, or selective silicon dry etching removal of one side of the etch pit to define a cavity.

11 Claims, 8 Drawing Sheets

(51) Int. Cl.
*G02B 6/136* (2006.01)
*G02B 6/42* (2006.01)

(52) U.S. Cl.
CPC .............. *G02B 2006/12061* (2013.01); *G02B 2006/12104* (2013.01); *G02B 2006/12176* (2013.01)

(56) References Cited

U.S. PATENT DOCUMENTS

| | | | | |
|---|---|---|---|---|
| 6,677,655 | B2* | 1/2004 | Fitzergald | G02B 6/12 257/186 |
| 7,175,777 | B1* | 2/2007 | Labonte | B81C 1/00547 216/26 |
| 7,519,257 | B2* | 4/2009 | Lipson | B82Y 20/00 385/126 |
| 7,935,554 | B2* | 5/2011 | Lee | H01L 21/0237 257/E21.219 |
| 8,652,934 | B1* | 2/2014 | Meade | G02B 6/136 257/506 |
| 8,901,576 | B2* | 12/2014 | Doany | H01L 21/76251 257/88 |
| 9,269,569 | B1* | 2/2016 | Han | H01L 21/02381 |
| 2007/0052059 | A1* | 3/2007 | Labonte | B81C 1/00547 257/499 |
| 2011/0069973 | A1* | 3/2011 | Krishnamoorthy | G02B 6/12 398/200 |
| 2011/0115042 | A1* | 5/2011 | Labonte | B81C 1/00547 257/432 |
| 2012/0142173 | A1* | 6/2012 | Watanabe | H01L 21/02378 438/504 |
| 2013/0181233 | A1* | 7/2013 | Doany | H01L 21/76251 257/88 |
| 2014/0193115 | A1* | 7/2014 | Popovic | G02B 6/124 385/14 |
| 2014/0205234 | A1* | 7/2014 | Rong | G02B 6/4201 385/28 |

OTHER PUBLICATIONS

A.V. Krishnamoorthy et al: "Computer systems based on silicon photonic interconnects" Proceedings of the IEEE 97 (7), 1337-1361, Jul. 7, 2009.

B. Thomas Smith et al: "Fundamentals of silicon photonic devices" white paper, Kotura Inc, downloaded from kotura.com on Dec. 28, 2016. www.kotura.com/pdf/KOTURA_Fundamentals_of_Silicon_Photonic_Devices.pdf.

D. Feng et al: "High-speed GeSi EA modulator at 1550nm" IEEE Group IV Photonics 2012, San Diego, FD2, pp. 355-357, Sep. 13, 2012.

D. Feng et al: "High-speed Ge photodetector monolithically integrated with large cross-section silicon-on-insulator waveguide" Appl. Phys. Lett. 95, 261105, Dec. 29, 2009.

Drago Resnik et al: "The role of Triton surfactant in anisotropic etching of {1 1 0} reflective planes on (1 0 0) silicon" 2005, J.Micromech. Microeng. 15 1174, Apr. 22, 2005.

* cited by examiner

⟋ 800

```
┌─────────────────────────────────────────────────────────┐
│ DEFINE ETCH PIT IN A SEMICONDUCTOR LAYER DISPOSED ON A  │
│         BURIED-OXIDE LAYER USING A WET-ETCHING PROCESS  │
│                            810                          │
└─────────────────────────────────────────────────────────┘
                              │
                              ▼
┌─────────────────────────────────────────────────────────┐
│         DISPOSE A FILLING MATERIAL IN THE ETCH PIT      │
│                            812                          │
└─────────────────────────────────────────────────────────┘
```

FIG. 8

SURFACE-NORMAL COUPLER FOR SILICON-ON-INSULATOR PLATFORMS

GOVERNMENT LICENSE RIGHTS

This invention was made with United States government support under Agreement No. HR0011-08-9-0001 awarded by DARPA. The United States government has certain rights in the invention.

BACKGROUND

Field

The present disclosure generally relates to the design of photonic integrated circuits (PICs). More specifically, the present disclosure relates to a PIC that includes a surface-normal coupler that couples an optical signal from another PIC.

Related Art

Optical interconnects or links based on silicon photonics have the potential to alleviate inter-chip communication bottlenecks in high-performance computing systems that include a large number of processor chips and memory chips. This is because, relative to electrical interconnects, optical interconnects offer significantly improved: bandwidth, density, power consumption, latency, and range.

Much of the research on silicon photonics has focused on sub-micron silicon-on-insulator (SOI) technologies because they allow both active and passive optical devices to be implemented. Moreover, the use of grating couplers further enables sub-micron silicon-photonic optical links through optical fibers or chip-to-chip direct optical proximity coupling. Using such optical devices, even a multi-chip optical interconnect network with all-to-all full connectivity can be implemented using grating-based surface-normal couplers without any optical waveguide crossing. However, silicon optical waveguides on an SOI platform with a silicon thickness less than 1.5 μm have a different effective index of refraction and group index of refraction for transverse electric (TE) and transverse magnetic (TM) polarization, respectively. Therefore, one of the weaknesses of sub-micron SOI platforms is that most of the optical devices are very polarization-sensitive, which makes it difficult to implement a wavelength-division-multiplexing (WDM) silicon-photonic optical link over fiber.

Alternatively, silicon optical waveguides on a thicker SOI platform (e.g., a silicon layer having a thickness greater than 1.5 μm) can be made with an identical effective index of refraction and group index of refraction for both TE and TM polarizations. Consequently, silicon-photonic optical devices on a thicker SOI platform, e.g., a silicon layer having a thickness of 3 μm, can be polarization-insensitive. Low-loss optical waveguides and other polarization-insensitive WDM optical components for such an SOI platform are available. The recent successful demonstrations of germanium-based high-speed active optical devices on a 3 μm SOI platform, as well as a Franz-Keldysh modulator and a photo-detector, make a thicker SOI platform promising for intra/inter-chip WDM silicon-photonic optical links. However, for a multi-chip application with chip-to-chip interconnects (such as a so-called 'macrochip'), a compact surface-normal coupler with low loss and broad optical bandwidth is not available for a thicker SOI platform.

In particular, while specially designed grating couplers have been reported for surface-normal coupling for thick SOI platforms with silicon layers having thicknesses of up to 2 μm. However, it is not clear that these grating couplers will be as effective for thicker SOI platforms, such as those with silicon layers having a thickness of 3 μm. Even if the grating couplers work in this regime, the polarization sensitivity of grating couplers may restrict the use of thicker SOI platforms.

For the thicker SOI platforms, it may be possible to utilize a reflecting facet on the optical waveguide for surface-normal coupling. Silicon micro-machining using dry etching of a silicon wafer at an angle can create a reflecting facet at the end of the silicon optical waveguide. When the optical signal in these optical waveguide reaches the reflecting facet etched with a right angle, it may be reflected normal to the surface because of total internal reflection (TIR). While this approach can be implemented as a wafer-scale process, it can be very challenging to create the reflecting facet with good uniformity and repeatability. In principle, laser milling or focused ion beam (FIB) can also be used to create such a reflecting facet on silicon optical waveguides. However, these fabrication techniques are not wafer-scale processes and, thus, are not suitable for low-cost, high-yield volume production.

Hence, what is needed is a surface-normal coupler for use with thicker SOI platforms without the problems described above.

SUMMARY

One embodiment of the present disclosure provides an integrated circuit that includes a substrate, and a buried-oxide layer disposed on the substrate. Moreover, the integrated circuit includes a semiconductor layer, disposed on the buried-oxide layer, having a top surface, where the semiconductor layer includes an etch pit having sides defined by a crystallographic plane of the semiconductor layer, the etch pit extends from the top surface to the buried-oxide layer, and one of the sides includes a mirror facet. Note that the semiconductor layer is included in an optical waveguide that conveys an optical signal. Furthermore, the integrated circuit includes a filling material disposed in the etch pit.

The substrate, the buried-oxide layer and the semiconductor layer may comprise a silicon-on-insulator technology. For example, the semiconductor layer may include silicon.

Moreover, the sides may be at an angle with respect to the top surface. This angle may be associated with the crystallographic plane. For example, the angle may include: 45°, or an angle corresponding to the crystallographic plane and a tilt angle of the substrate during fabrication of the etch pit. In particular, for total internal reflection, the angle may be between 38-52°.

Note that the etch pit may be fabricated using a wet-etching process.

Furthermore, the mirror facet may include: a metal layer disposed on the one of the sides; and/or a dielectric coating disposed on the one of the sides.

Additionally, the integrated circuit may include an oxide layer disposed on the semiconductor layer underneath the mirror facet.

In some embodiments, the semiconductor layer includes: an etch-stop layer disposed under the filling material and above the mirror facet; and a cavity between the mirror facet and a side of the semiconductor layer. For example, the etch-stop layer may include: silicon dioxide and/or silicon nitride.

Note that the filling material may include: polycrystalline silicon, a silicon-germanium alloy, and/or a material having an index of refraction that approximately matches an index of refraction of the semiconductor layer.

Another embodiment provides a system that includes two instances of the integrated circuit having top surfaces that face each other, where these two integrated circuits convey the optical signal between the integrated circuits using surface-normal optical proximity communication.

Another embodiment provides a method for fabricating the integrated circuit that includes the optical waveguide centered on the semiconductor layer in the integrated circuit. During the method, an etch pit is defined in the semiconductor layer disposed on the buried-oxide layer using the wet-etching process, where the etch pit has sides defined by the crystallographic plane of the semiconductor layer, the etch pit extends from the top surface of the semiconductor layer to the buried-oxide layer, and one of the sides of the etch pit includes the mirror facet. Then, a filling material is disposed in the etch pit.

BRIEF DESCRIPTION OF THE FIGURES

FIG. 8 is a flow diagram illustrating a method for fabricating a PIC in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a photonic integrated circuit (PIC), a system that includes the PIC, and a method for fabricating the PIC are described. This PIC includes an inverse facet mirror on a silicon optical waveguide for optical proximity coupling between two silicon-on-insulator (SOI) chips placed face to face. Accurate mirror facets may be fabricated in etch pits using a silicon micro-machining technique, for example, by wet etching of the silicon <110> facet at an angle of 45° when etched through the <100> surface. (More generally, the angle may be between 38-52°, which may result in total internal reflection.) Moreover, by filling the etch pit with polycrystalline silicon or another filling material that has an index of refraction similar to silicon (such as a silicon-germanium alloy), a reflecting mirror with an accurate angle can be formed at the end of the silicon optical waveguide using: a metal coating, a dielectric coating, thermal oxidation, or selective silicon dry etching removal of one side of the etch pit to define a cavity.

Using such a compact surface-normal coupler, broadband SOI optical waveguide-to-optical waveguide optical proximity coupling can be achieved with low loss and high density. Moreover, the accurate mirror facet may facilitate an ultra-compact surface-normal coupler. This optical coupling technique may offer good uniformity and repeatability in a wafer-scale process, which may facilitate wafer-scale testing and low-cost, high-yield volume production of the PIC.

We now describe embodiments of the PIC (which is sometimes referred to as a 'chip'). In this PIC, by lithographically defining accurate openings aligned with a silicon crystallographic plane, an etch pit with an accurate size and facet angles can be fabricated using selective wet etching. When the etch opening on the <100> plane is aligned with the <110> silicon crystallographic plane, etch pits with 45° mirror facets can be obtained with accurate mirror-facet positions. (More generally, the angle may be between 38-52°.) However, direct termination of a silicon optical waveguide using the accurate etch pit mirror facets results in a beam-reflecting direction pointing to the silicon substrate (a so-called 'negative facet'), which is not ideal for surface-normal coupling. Instead, an inverse mirror facet is typically needed to reflect the optical signal upward (a so-called 'positive facet'). By filling the etch pit to terminate the silicon optical waveguide, a mirror facet or reflector facet with the desired reflecting angle can be obtained.

Figure 1:
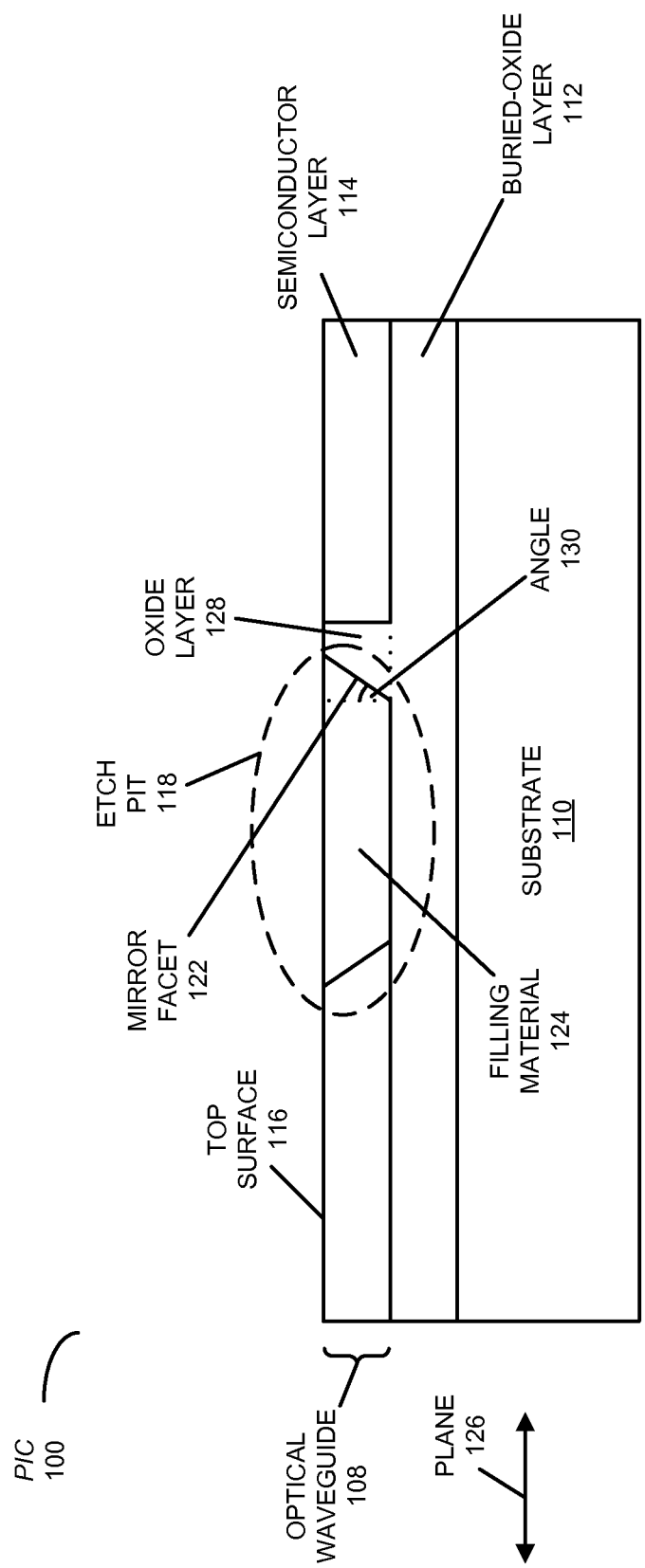
FIG. 1 is a block diagram illustrating a side view of a photonic integrated circuit (PIC) with an inverse reflecting facet in accordance with an embodiment of the present disclosure.

FIG. 1 presents a block diagram illustrating a side view of a PIC 100 with an inverse reflecting facet or mirror facet 122. This PIC includes substrate 110, and a buried-oxide layer 112 disposed on substrate 110. Moreover, PIC 100 includes a semiconductor layer 114, disposed on buried-oxide layer 112, having a top surface 116, where semiconductor layer 114 includes an etch pit 118 having sides defined by a crystallographic plane of semiconductor layer 114, etch pit 118 extends from top surface 116 to buried-oxide layer 112, and one of the sides includes mirror facet 122. Note that semiconductor layer 114 is included in an optical waveguide 108 that conveys an optical signal. Furthermore, PIC 100 includes a filling material 124 disposed in etch pit 118, where an index of refraction of filling material 124 and an index of refraction associated with mirror facet 122 ensure that the optical signal undergoes total internal reflection from a plane 126 of buried oxide layer 112 toward top surface 116 (i.e., a positive facet). For example, PIC 100 may include an oxide layer 128 disposed on semiconductor layer 114 underneath mirror facet 122.

Note that substrate 110, buried-oxide layer 112 and semiconductor layer 114 may comprise a silicon-on-insulator technology. For example, semiconductor layer 114 may include silicon.

Moreover, the sides may be at an angle 130 with respect to top surface 116. This angle may be associated with the crystallographic plane. For example, angle 130 may include: 45°, or an angle corresponding to the crystallographic plane and a tilt angle of substrate 110 during fabrication of etch pit 118. In particular, for total internal reflection, the angle may be between 38-52°. Note that etch pit 118 may be fabricated using a wet-etching process.

Furthermore, filling material 124 may include: polycrystalline silicon, a silicon-germanium alloy, and/or a material having an index of refraction that approximately matches an index of refraction of semiconductor layer 114. The polycrystalline silicon may be deposited at a low temperature and, thus, may be amorphous. Consequently, a chemical mechanical polish may be used to planarize filling material 124.

Figure 2:
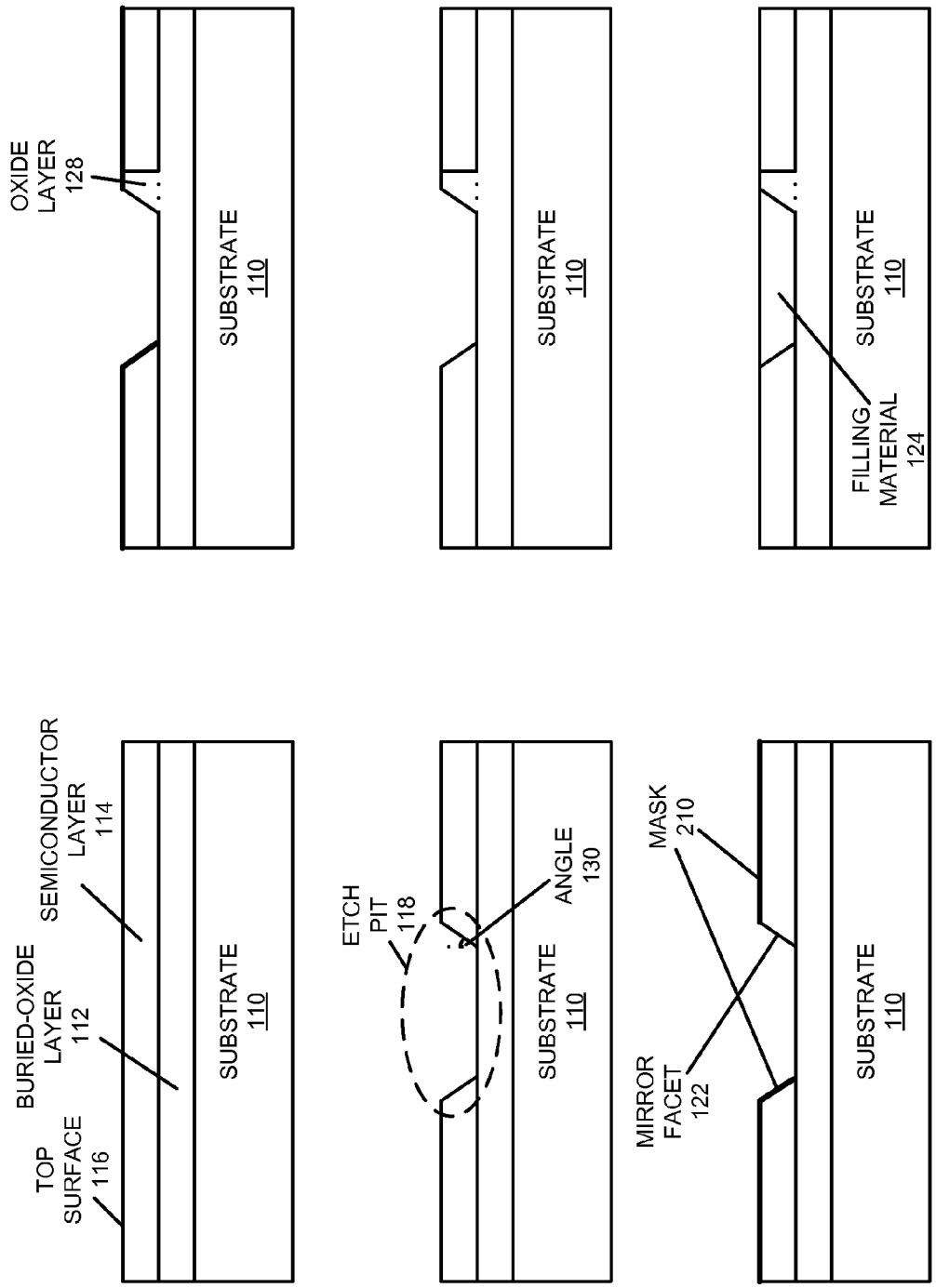
FIG. 2 is a flow diagram illustrating fabrication of the inverse reflecting facet in the PIC of FIG. 1 in accordance with an embodiment of the present disclosure.

FIG. 2 presents a flow diagram illustrating fabrication of the inverse reflecting facet or mirror facet 122 in PIC 100 (FIG. 1). In this fabrication process, by opening an etch window on the top <100> of crystallographic plane of semiconductor layer 114, etch pit 118 can be created using a selective wet etch. Etch pit 118 may have an accurate position defined by the etch window. The facets of etch pit 118 are automatically terminated at either the <111> or the <110> crystallographic plane of semiconductor layer 114 (such as silicon) depending on the alignment of the etch window relative to the two crystallographic planes. The facet angle 130 will be 45° for the <110> facets.

Then, semiconductor layer 114 is coated with a mask 210 to cover the entire top surface 116 except the right-side etch-pit facet. The exposed semiconductor facet can be oxidized using thermal oxidation or using other means to form oxide layer 128. After the oxidation, the mask material is removed, and etch pit 118 is filled with filling material 124 that has an index of refraction similar to semiconductor layer 114 (e.g., polycrystalline silicon in the case of a silicon semiconductor layer 114). Finally, top surface 116 is polished.

By replacing a portion of optical waveguide 108 (FIG. 1) that is etched away with an optical waveguide structure formed by filling material 124, a surface-normal coupler is formed for optical waveguide 108 (FIG. 1) on the left-hand side in FIG. 2 by the facet on the right-hand side of etch pit 118. Using silicon as an example, because filling material 124 has a similar index of refraction as the silicon, the optical signal in optical waveguide 108 (FIG. 1) propagates through the left-hand-side silicon/filling-material interface with little loss. But the right-hand-side etch-pit facet (i.e., mirror facet 122 in FIG. 1) is a total-internal-reflection mirror with an inverse reflecting facet for the optical signal propagating in optical waveguide 108 (FIG. 1) because filling material 124 has a higher index of refraction than the oxidized silicon.

Note that the etch window size can be very small (e.g., less than 10 μm), because it only needs to be big enough to ensure etch pit 118 terminates at buried-oxide layer 112. Moreover, the propagation loss of optical waveguide 108 (FIG. 1) in filling material 124 may be negligible, and the position of mirror facet 122 is lithographically defined, so it can be very accurate. Furthermore, angle 130 is determined, at least in part, by the crystallographic plane, so it may be accurate, uniform and repeatable, even though oxidation may change angle 130 slightly because of changes in the material volume from top surface 116 to buried-oxide layer 112.

Figure 3:
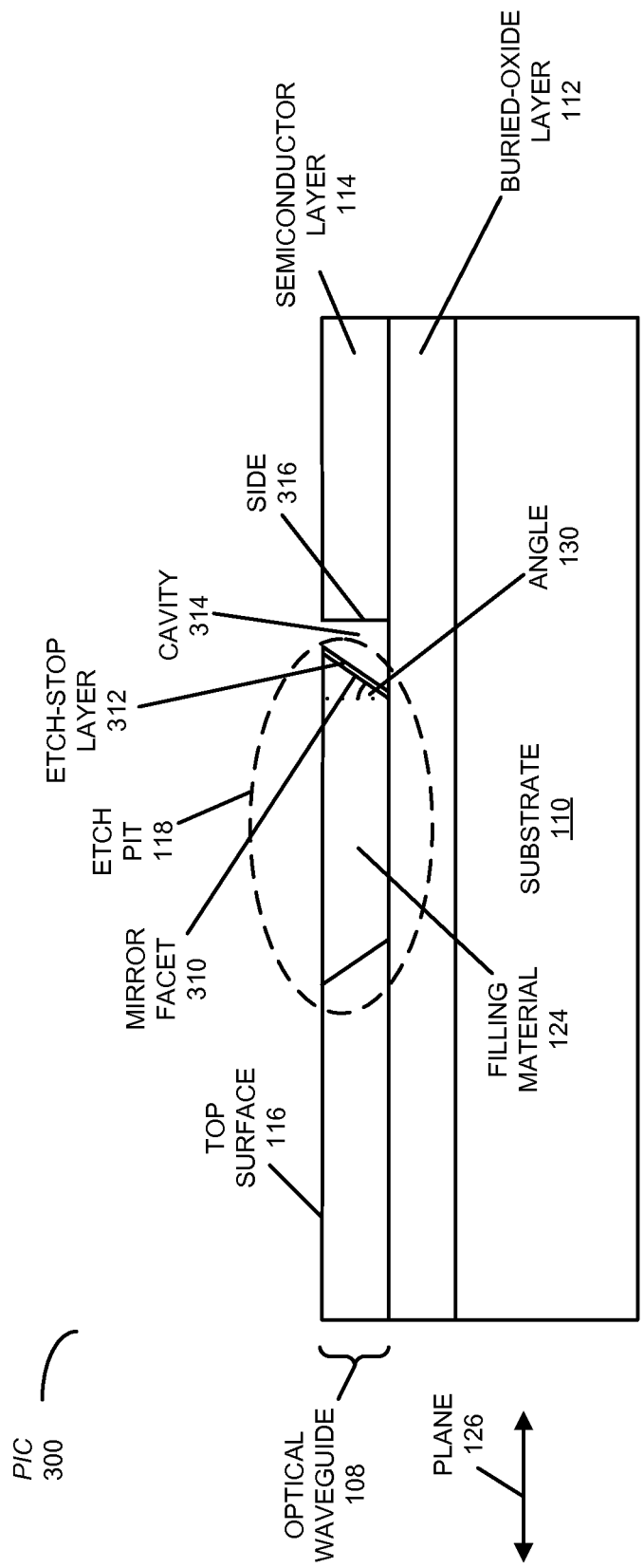
FIG. 3 is a block diagram illustrating a side view of a PIC with an inverse reflecting facet in accordance with an embodiment of the present disclosure.

While FIGS. 1 and 2 illustrate one approach based on oxidation for fabrication of the mirror facet, in other embodiments different techniques may be used. One of these alternative approaches is shown in FIG. 3, which presents a block diagram illustrating a side view of a PIC 300 with an inverse reflecting facet or mirror facet 310. In this PIC 300, semiconductor layer 114 includes: an etch-stop layer 312 disposed under filling material 124 and above mirror facet 310; and a cavity 314 between mirror facet 310 and a side 316 of semiconductor layer 114. For example, etch-stop layer 312 may include: silicon dioxide and/or silicon nitride.

Figure 4:
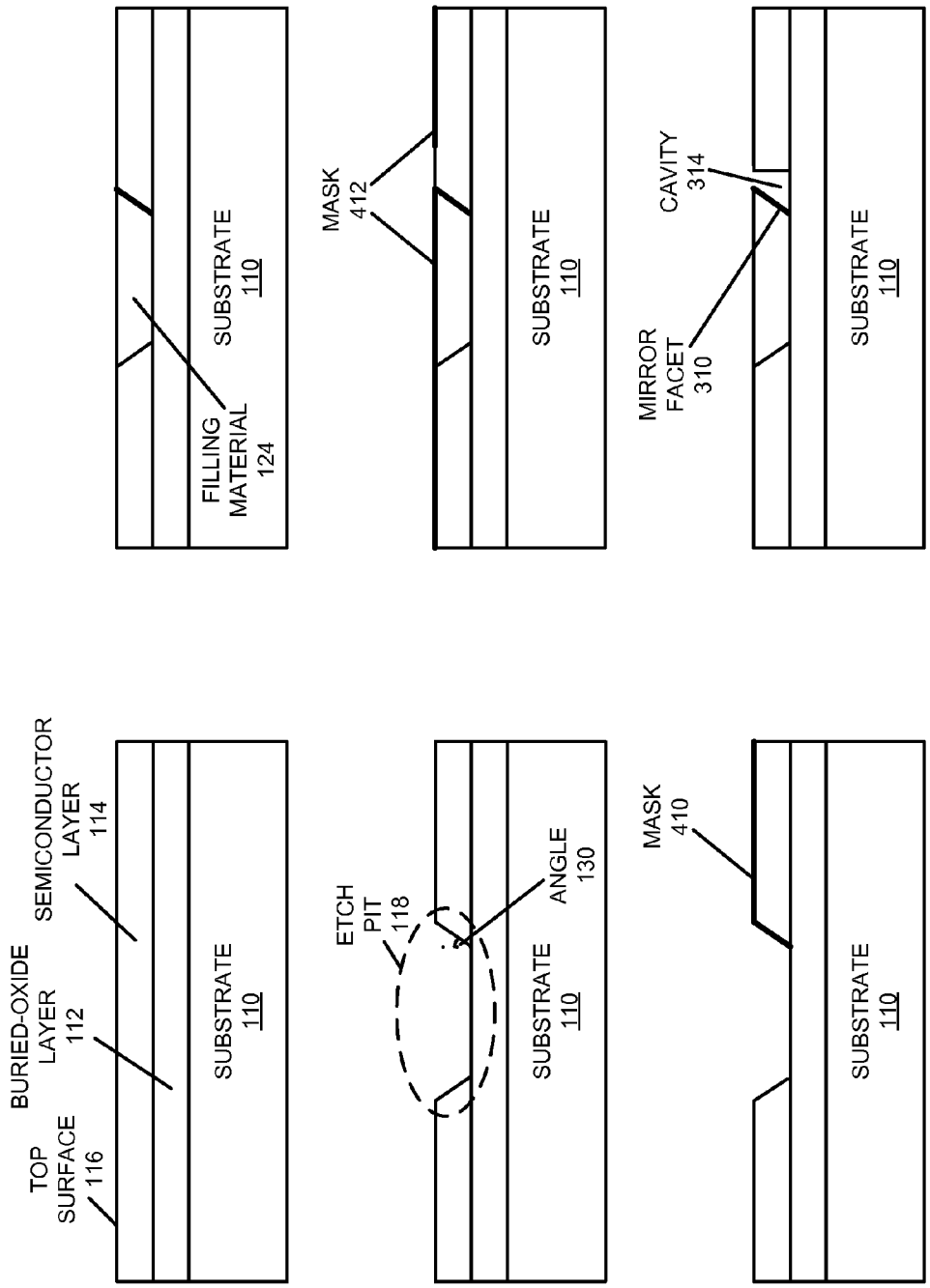
FIG. 4 is a flow diagram illustrating fabrication of the inverse reflecting facet in the PIC of FIG. 3 in accordance with an embodiment of the present disclosure.

FIG. 4 presents a flow diagram illustrating fabrication of the inverse reflecting facet or mirror facet 310 in PIC 300 (FIG. 3). In this fabrication process, mirror facet 310 is fabricated by removing one of the etch-pit facets (i.e., side 316) using isotropic dry etching. In particular, once etch pit 118 is formed, a mask 410 is applied to the right-hand side of etch pit 118. Then, filling material 124 (e.g., polycrystalline silicon) is deposited to completely fill etch pit 118.

Next, top surface 116 is polished, and a mask 412 (i.e., etch-stop layer 312) is deposited to protect semiconductor layer 114 except for a small area right next to the right-hand side etch-pit facet. Using an isotropic dry etch through the mask opening, the etch-pit facet on the right-hand side can be removed to create cavity 314. However, the facet of filling material 124 will not be affected because it is protected by the etch-stop layer (i.e., mask 410). A material with a low index of refraction can be used to fill cavity 314, or it can remain unfilled. In this way, an inverse reflecting facet or mirror facet 310 with accurate angle 130 (FIG. 3) of 45° (and, more generally, between 38 and 52°) defined solely by the crystallographic plane of semiconductor layer 114 may be fabricated at the end of optical waveguide 108 (FIG. 1), which can be used as a surface-normal coupler for optical waveguide 108 (FIG. 1).

Figure 5:
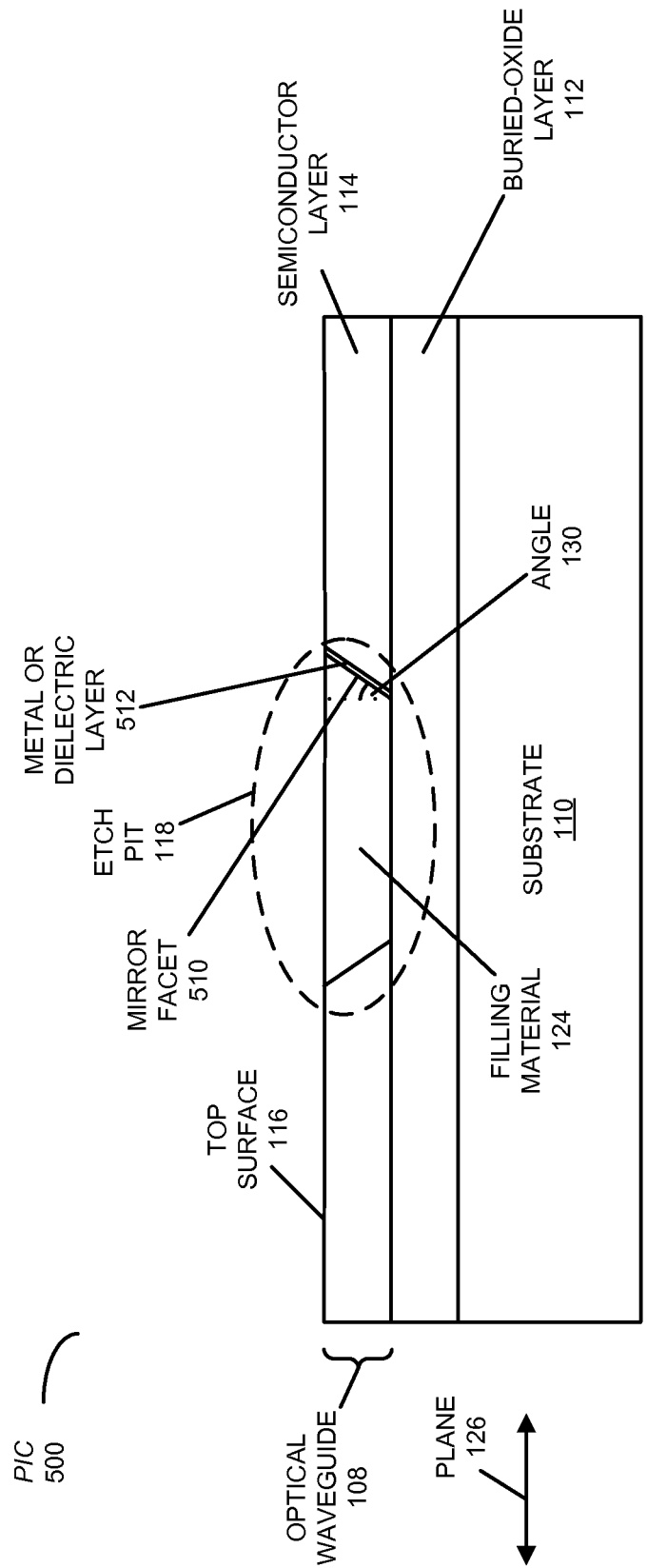
FIG. 5 is a block diagram illustrating a side view of a PIC with an inverse reflecting facet in accordance with an embodiment of the present disclosure.

Another alternative approach is shown in FIG. 5, which presents a block diagram illustrating a side view of a PIC 500 with an inverse reflecting facet or mirror facet 510. In this PIC 500, mirror facet 510 may include: a metal or dielectric layer 512 disposed on one of the sides.

Figure 6:
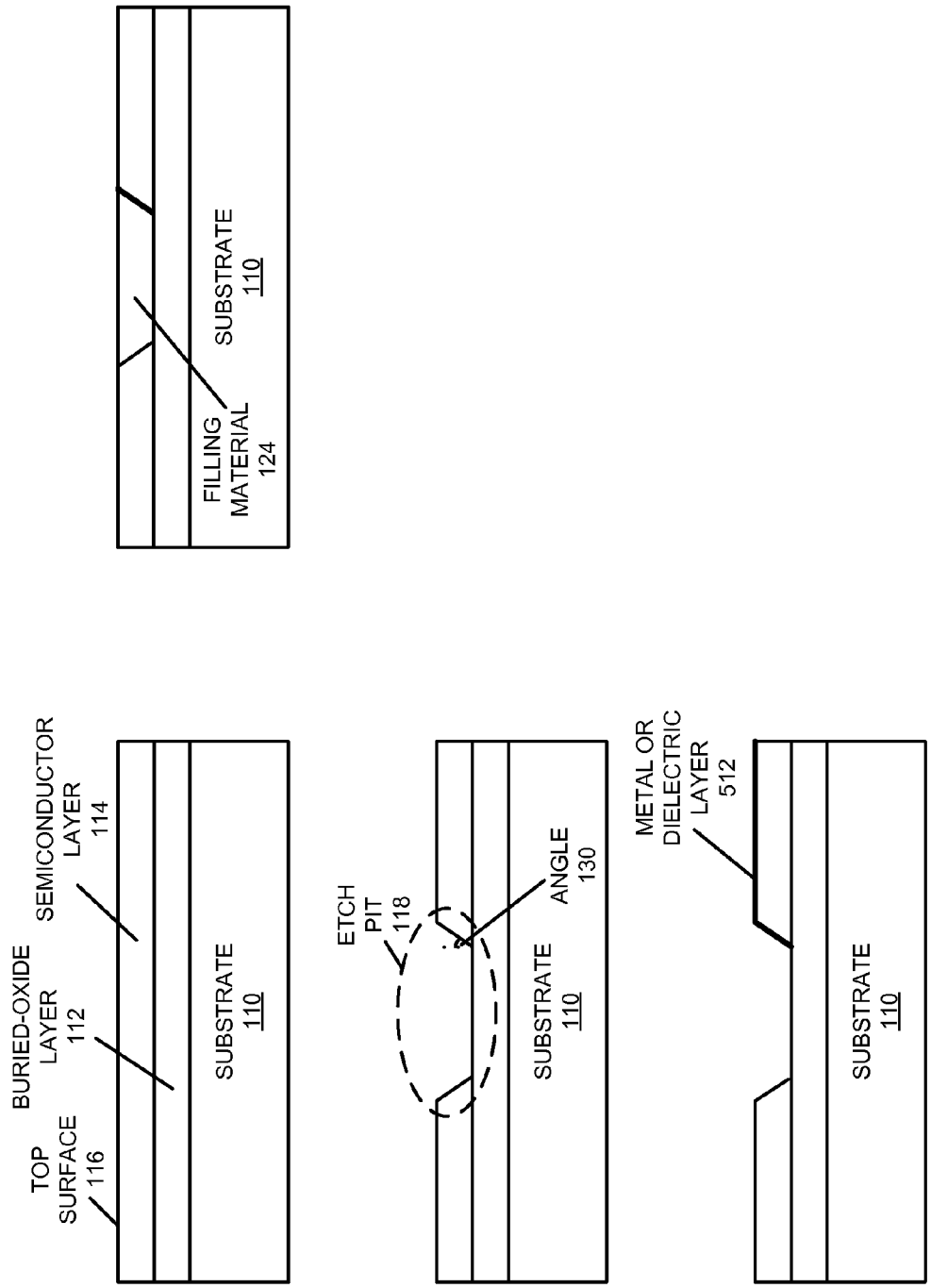
FIG. 6 is a flow diagram illustrating fabrication of the inverse reflecting facet in the PIC of FIG. 5 in accordance with an embodiment of the present disclosure.

FIG. 6 presents a flow diagram illustrating fabrication of the inverse reflecting facet or mirror facet 510 in PIC 500 (FIG. 5). In this fabrication process, mirror facet 510 can be obtained by coating the etch-pit facet with a metal or dielectric layer 512. In particular, after etch pit 118 is fabricated, a metal or dielectric mirror coating is applied on the right-hand side facet of etch pit 118. Then, etch pit 118 is filled with filling material 124 with an index of refraction similar to that of semiconductor layer 114 (e.g., polycrystalline silicon). Next, the wafer may be polished to flat. In this way, an inverse reflecting facet or mirror facet 510 with an accurate angle 130 of 45° (and, more generally, between 38 and 52°) defined solely by the crystallographic plane may be fabricated at the end of optical waveguide 108 (FIG. 1), which can be used as a surface-normal coupler for optical waveguide 108 (FIG. 1).

Figure 7:
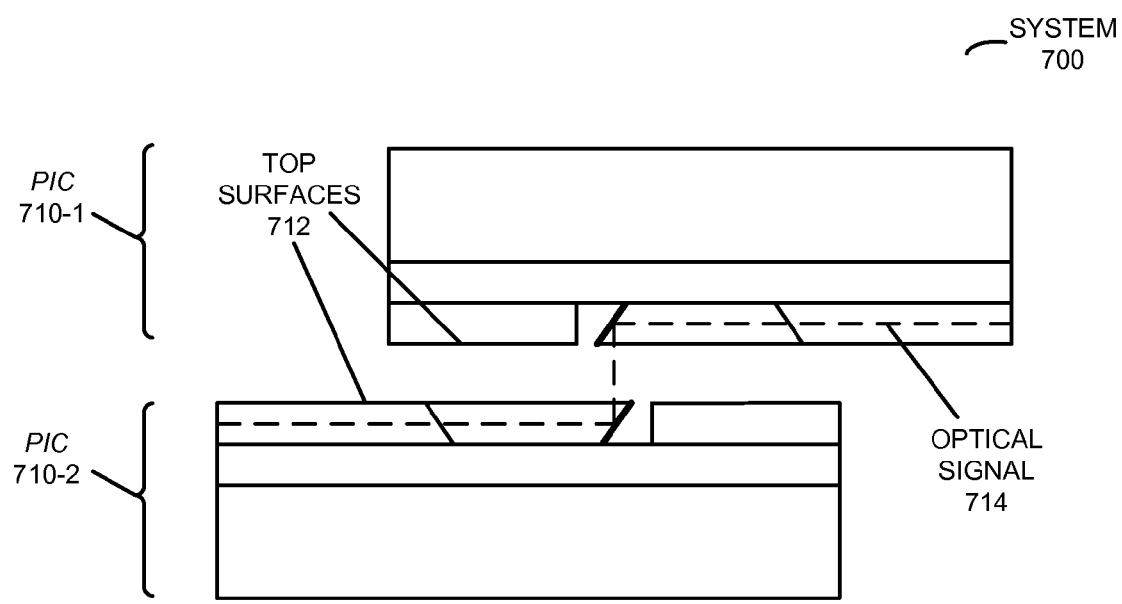
FIG. 7 is a block diagram illustrating a side view of a system that includes two instances of the PIC of FIG. 1 and 3 or 5 in accordance with an embodiment of the present disclosure.

We now describe the system. FIG. 7 presents a block diagram illustrating a side view of a system 700 that includes two instances of PIC 710, such as PIC 100 (FIG. 1), PIC 300 (FIG. 3) or PIC 500 (FIG. 5). In this system, PICs 710 have top surfaces 712 that face each other. These PICs 710 convey optical signal 714 between PICs 710 using surface-normal optical proximity communication.

As noted previously, PICs 710 may be implemented using silicon-on-insulator technology. In particular, PICs 710 may include: buried-oxide layer 112 (FIGS. 1-6) disposed on substrate 110 (FIGS. 1-6); and semiconductor layer 114 (FIGS. 1-6) disposed on buried-oxide layer 112 (FIGS. 1-6). Moreover, substrate 110 (FIGS. 1-6) may include a semiconductor, such as silicon.

In an exemplary embodiment, semiconductor layer 114 (FIGS. 1-6) may have a thickness that is greater than 1.5 μm (such as 3 μm). Furthermore, buried-oxide layer 112 (FIGS. 1-6) may have a thickness between 0.3 and 3 μm (such as 0.8 μm).

Note that system 700 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. In some embodiments, the computer system may be at one location or may be distributed over multiple, geographically dispersed locations.

Moreover, the preceding embodiments of the PIC and/or the system may include fewer components or additional components. Moreover, the substrates may include: a semiconductor die (such as silicon), a ceramic, an organic material and/or glass.

Although the PICs and the system are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. In addition, functionality in the preceding embodiments may be implemented more in hardware and less in software, or less in hardware and more in software, as is known in the art.

Note that components in the preceding embodiments of the PIC and the system may be fabricated using a wide variety of techniques, as is known to one of skill in the art, including silicon-machining techniques, such as wet etching and dry etching.

We now describe the method. FIG. 8 presents a flow diagram illustrating a method 800 for fabricating a PIC, such as PIC 100 (FIG. 1), PIC 300 (FIG. 3) or PIC 500 (FIG. 5), which includes the optical waveguide centered on the semiconductor layer in the PIC. During this method, an etch pit is defined in the semiconductor layer disposed on a buried-oxide layer using a wet-etching process (operation 810), where the etch pit has sides defined by a crystallographic plane of the semiconductor layer, the etch pit extends from a top surface of the semiconductor layer to the buried-oxide layer, and one of the sides of the etch pit includes a mirror facet. Then, a filling material is disposed in the etch pit (operation 812).

In some embodiments of method 800, there may be additional or fewer operations. For example, the aforementioned surface-normal coupler can be processed either before or after definition of the optical waveguide in the integrated circuit.

Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
    a substrate;
    a buried-oxide layer disposed on the substrate;
    a semiconductor layer, disposed on the buried-oxide layer, having a top surface, wherein the semiconductor layer includes an etch pit having sides defined by a crystallographic plane of the semiconductor layer, wherein the etch pit extends from the top surface to the buried-oxide layer, wherein one of the sides includes a mirror facet, wherein the semiconductor layer is included in an optical waveguide configured to convey an optical signal, and wherein the integrated circuit includes an oxide layer disposed on the semiconductor layer underneath the mirror facet; and
    a filling material disposed in the etch pit.

2. The integrated circuit of claim 1, wherein the substrate, the buried-oxide layer and the semiconductor layer comprise a silicon-on-insulator technology.

3. The integrated circuit of claim 1, wherein the semiconductor layer includes silicon.

4. The integrated circuit of claim 1, wherein the sides are at an angle with respect to the top surface; and
    wherein the angle is associated with the crystallographic plane.

5. The integrated circuit of claim 4, wherein the angle includes one of: 45°, and an angle corresponding to the crystallographic plane and a tilt angle of the substrate during fabrication of the etch pit.

6. The integrated circuit of claim 1, wherein the etch pit is fabricated using a wet-etching process.

7. The integrated circuit of claim 1, wherein the filling material includes one of: polycrystalline silicon, a silicon-germanium alloy, and a material having an index of refraction that approximately matches an index of refraction of the semiconductor layer.

8. A system, comprising:
    two integrated circuits having top surfaces that face each other, wherein the integrated circuits are configured to convey an optical signal between the integrated circuits using surface-normal optical proximity communication, and
    wherein a given one of the integrated circuits includes:
        a substrate;
        a buried-oxide layer disposed on the substrate;
        a semiconductor layer, disposed on the buried-oxide layer, having a top surface, wherein the semiconductor layer includes an etch pit having sides defined by a crystallographic plane of the semiconductor layer, wherein the etch pit extends from the top surface to the buried-oxide layer, wherein one of the sides includes a mirror facet, wherein the semiconductor layer is included in an optical waveguide configured to convey an optical signal, and wherein the integrated circuit includes an oxide layer disposed on the semiconductor layer underneath the mirror facet; and
        a filling material disposed in the etch pit.

9. The system of claim 8, wherein the substrate, the buried-oxide layer and the semiconductor layer comprise a silicon-on-insulator technology.

10. The system of claim 8, wherein the sides are at an angle with respect to the top surface; and
   wherein the angle is associated with the crystallographic plane.

11. The system of claim 8, wherein the filling material includes one of: polycrystalline silicon, a silicon-germanium alloy, and a material having an index of refraction that approximately matches an index of refraction of the semiconductor layer.

* * * * *

UNITED STATES PATENT AND TRADEMARK OFFICE
CERTIFICATE OF CORRECTION

PATENT NO. : 9,696,486 B2  
APPLICATION NO. : 13/955705  
DATED : July 4, 2017  
INVENTOR(S) : Zheng et al.

Page 1 of 1

It is certified that error appears in the above-identified patent and that said Letters Patent is hereby corrected as shown below:

In the Specification

In Column 3, Line 42, delete "FIG." and insert -- FIGS. --, therefor.

In Column 7, Lines 43-45, delete "to the buried-oxide layer, and one of the sides of the etch pit includes a mirror facet. Then, a filling material is disposed in the etch pit (operation 812)." and insert the same on Column 7, Line 42, as a continuation of the same paragraph.

In Column 7, Lines 51-53, delete "Moreover, the order of the operations may be changed, and/or two or more operations may be combined into a single operation." and insert the same on Column 7, Line 50, as a continuation of the same paragraph.

Signed and Sealed this  
Twelfth Day of June, 2018

Andrei Iancu  
*Director of the United States Patent and Trademark Office*